(12) United States Patent
Soman (10) Patent No.: US 11,263,039 B2
(45) Date of Patent: Mar. 1, 2022

(54) HIGH PERFORMANCE ATTACHABLE WRITEABLE VOLUMES IN VDI DESKTOPS

(71) Applicant: VMware, Inc., Palo Alto, CA (US)

(72) Inventor: Sisimon Soman, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 161 days.

(21) Appl. No.: 16/685,322

(22) Filed: Nov. 15, 2019

(65) Prior Publication Data
US 2021/0149700 A1    May 20, 2021

(51) Int. Cl.
*G06F 9/455* (2018.01)
*G06F 9/451* (2018.01)
*G06F 9/30* (2018.01)

(52) U.S. Cl.
CPC ...... *G06F 9/45558* (2013.01); *G06F 9/30087* (2013.01); *G06F 9/452* (2018.02); *G06F 2009/45575* (2013.01); *G06F 2009/45579* (2013.01); *G06F 2009/45583* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0216975 A1* | 8/2009 | Halperin | ................. | H04L 67/10 |
| | | | | 711/162 |
| 2012/0084775 A1* | 4/2012 | Lotlikar | ............. | H04L 67/1097 |
| | | | | 718/1 |
| 2014/0082275 A1* | 3/2014 | Zhang | .................... | G06F 3/067 |
| | | | | 711/112 |

* cited by examiner

*Primary Examiner* — Dong U Kim (57) ABSTRACT

A system is described for providing more efficient ways to implement attachable writable volumes for capturing write data in virtual desktops. In particular, embodiments described herein leverage a local differencing virtual disk to which write data on a virtual machine is saved, and a background process for syncing the differencing virtual disk with an attachable master writable volume where user data is stored long-term. As a result, in cases where desktop performance would suffer due to limited data transfer speeds between the virtual machine and the master writable volume, the performance penalty caused by write delays is spared by writing the data first to the local differencing virtual disk, and then syncing the master writable volume with the differencing virtual disk in the background.

20 Claims, 5 Drawing Sheets

HIGH PERFORMANCE ATTACHABLE WRITEABLE VOLUMES IN VDI DESKTOPS

TECHNICAL FIELD

The present disclosure generally relates to virtual desktop infrastructure and more specifically to techniques for using attachable writeable volumes to capture write data on virtual desktops.

BACKGROUND

Virtual desktops provided as part of virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

In order to satisfy individual user requirements, each virtual desktop must be provided with a set of applications that are usually customized for the user. One approach for addressing the application delivery requirements, suited particularly to the remote desktop space, utilizes application storage volumes (ASVs), which are centrally stored and managed containers, such as virtual disks, containing one or more applications. The ASVs can be mounted or attached to a virtual machine to deliver contained applications to the virtual machine. With this technology, the ASVs are maintained in a central storage location that is accessible by virtual machines (VMs). Applications delivered using ASVs can become available on or be removed from the VM in a near-instant manner and can look and feel (to a user accessing the application on the VM via a client device) natively installed, while requiring minimal administrator involvement. Administrators can update or replace applications in real time and remove any assigned application, either immediately, while the user is still logged in, or at a next login or reboot. Furthermore, the administrator can perform these operations on any number of VMs simultaneously by simply indicating, via a management interface, which VMs or groups of VMs the operations should be performed on.

While ASVs provide a convenient, modular system for application delivery, the ASVs are generally read-only virtual disks containing the application(s), and a different mechanism needs to be used to capture user changes and user data on a virtual desktop. For this purpose, an attachable writable volume, which can be a read/write virtual disk, can be mounted to the virtual desktop to capture and store user data such as user files, settings, modifications, etc. The writable volume can be mounted to the virtual desktop like an ASV and modifications created in the virtual desktop can be directed to and stored on the writable volume. After the user logs off, the writable volume is stored in persistent storage. When the user logs on again, the writable volume can be mounted to a new VM to provide the user data and configurations in the virtual desktop provided to the user on the new VM.

With this technology, an enterprise can maintain a pool of standard base VMs for its users. When a user logs in, the system can retrieve a base VM for the user from the VM pool, mount the ASV(s) assigned to the user and the user's writeable volume to the VM, and provision the user with the VM, which would now contain the applications assigned to the user and the user's data. This provides a convenient and fast way to deliver customized VMs to users, which also reduces the burdens of VM management and maintenance compared to traditional approaches.

However, implementation of such writable volumes in virtual desktops still poses numerous challenges. For example, when a writable volume is used for capturing user data, writes on the virtual desktop are routed to the mounted volume. If the data transfer to the writable volume is slow, performance can be drastically affected as applications hang or freeze while waiting for write operations to complete. In cases where the writable volume can be mounted locally or otherwise in a way that provides quick write speeds from the virtual desktop, such as mounting directly to the hypervisor, this may not be an issue. However, in situations where the data transfer speed to the mounted writable volume is slow, such as when the writable volume is mounted from a remote storage device or from a file share to which data transfer is slower than ideal, the performance of the virtual desktop and the user experience can be severely degraded due to delays in writing to the writable volume.

What is needed is a more efficient way for implementing writable volumes in virtual desktops, particularly when data transfer speed to the writable volumes is limited.

DETAILED DESCRIPTION

Systems and methods in accordance with various embodiments of the present disclosure overcome at least some of the above-mentioned shortcomings and deficiencies by providing more efficient ways to implement attachable writable volumes for capturing write data in virtual desktops. In particular, embodiments described herein leverage a local differencing virtual disk to which write data on a virtual machine is saved, and a background process for synchronizing (syncing) the differencing virtual disk with an attachable "master" writable volume where user data is stored long-term. As a result, in cases where desktop performance would suffer due to limited data transfer speeds between the virtual machine and the master writable volume, the performance penalty caused by write delays is spared by writing the data first to the local differencing virtual disk, and then syncing the master writable volume with the differencing virtual disk in the background.

Generally, virtual desktop systems utilizing attachable writable volumes to capture and store user-specific data in virtual desktops are used in conjunction with application storage volumes ("ASVs") that deliver certain applications to the virtual desktop, as described above. App Volumes, available from VMware, Inc., is an example of such a system that uses ASVs and attachable writeable volumes (ASVs are referred to as "App Stacks" in VMware App Volumes). In such systems, after a user logs on, an agent running in the virtual machine merges ASV(s) containing applications that are assigned to the user, the user's writable volume(s), and any other layers such as a base image, etc., to provide a single combined view of the applications, user data, operating system, drivers, etc. in the virtual desktop. The agent is responsible for merging the contents of the ASVs and writable volumes with the file system of the virtual desktop so that, to the user, the applications and data contained within the ASV and the writable volume appear as if they are actually installed/contained on the system.

Particularly in the enterprise context, this provides numerous advantages in terms of efficiency and flexibility. For example, applications can be centrally managed via ASVs, users can be easily provisioned applications by attaching ASVs, and applications can likewise be easily removed, updated, etc. Furthermore, specific virtual machines don't have to be maintained for specific users; instead, each time a virtual desktop is requested by a user, a standard virtual machine can be provisioned (e.g., from a VM pool) and any assigned ASVs and the user's writable volume can be attached and merged to deliver the virtual desktop to the user. Every time the user logs on, it may appear that she receives the same desktop, with the same applications and user data as in previous log-ons, although the actual VM may be different each time.

It should be noted that while attachable writable volumes would often be implemented in conjunction with ASVs, this would not necessarily always be the case. In various embodiments, a writable volume can be mounted to a virtual desktop without the mounting of any ASVs. In this case, the user would simply not be provided with any ASV-contained applications. However, in various embodiments, the writable volume itself may contain applications, or applications may be delivered to the virtual desktop in other ways (e.g., by including the applications in other layers, etc.).

Generally, ASVs are virtual disks, such as VMDK (Virtual Machine Disk) or VHD (Virtual Hard Disk), that contain everything needed to run the contained application, such as executables and registry keys. An ASV can be maintained in a central location and be assigned from there to different users' virtual desktops without changing the physical location of the ASV. Applications can be captured in ASVs using a file system filter driver, which can redirect file and registry open/create requests from one volume to another. The capture process begins by installing the application or applications on a staging machine, which may be a virtual machine. During capture, a writable virtual disk is attached to the staging machine and all file/registry creation and modifications made during the application installation process are redirected to that disk, such that when an application is installed, all its content gets captured on that virtual disk. After installation is complete, the virtual disk can be used to produce an ASV that is attachable on other machines to deliver the application or applications that were captured on it.

The produced ASV can then be assigned (e.g. by an administrator) to a particular virtual machine to deliver the applications in the ASV to the virtual machine. During application delivery, the corresponding ASV is attached to the virtual machine in read-only mode (e.g. the virtual disk containing the application content is mounted on the VM). A file-system filter driver can merge the file and registry information from the ASV with the operating system of the virtual machine at runtime and generate a dynamic unified view for all the applications installed on the virtual machine.

Writable volumes can also be virtual disks, such as VMDK or VHD files, that are per-user volumes where users can install and configure their own applications and keep the data that is specific to their profiles. The mounting and merging of writeable volumes to a VM can be performed similarly to ASVs, except that the writeable volume is attached in read/write mode instead of read-only, and while an ASV may be mounted to multiple users' VMs, a writeable volume would generally be mounted in read/write mode to the VM belonging to the user.

At first, a writable volume can be an empty VMDK or VHD file that is assign to a specific user. It mounts to the virtual machine (VM) when the user authenticates to the desktop and user data/changes produced in the virtual desktop can be subsequently saved to it. Examples of the data that a writable volume can contain are application settings, user profile, licensing information, configuration files, user-installed applications, and others. During delivery, the writable volume is attached to the virtual machine in read/write mode (e.g. the virtual disk containing the writable volume content is mounted on the VM). A file-system filter driver can merge any file and any registry information from the writeable volume with the operating system of the virtual machine at runtime and generate a dynamic unified view for all the information on the virtual machine. After the user logs off, the writeable volume is saved and stored. On next logon, the writeable volume is mounted and merged, restoring the user data from the previous session.

Hence, because a writable volume is assigned to a specific user, the data that it stores can migrate with the user to different machines, creating an efficient and flexible way to manage user data. Physically, the writable volume can be located in a fixed location from where it is accessed by the VM to write and read data to/from the writable volume. With existing technologies, when a read command to information contained in the writable volume is produced at the VM, an agent operating on the VM directs the read command to the writeable volume and the information is retrieved from the writeable volume. When a write command to information contained in the writable volume is produced at the VM, the agent likewise directs the write command to the writeable volume and the information is conveyed and written to the writeable volume.

However, as mentioned above, in cases where data transfer to the writable volume is slow, performance can be drastically affected. For example, the operating system and applications may hang or freeze while waiting for write operations to complete (e.g., while waiting for write complete confirmation to be received from the writeable volume). In cases where the writable volume can be mounted locally or otherwise in a way that provides quick write speeds from the virtual desktop, such as mounting directly to the hypervisor, this may not be an issue. However, in situations where the data transfer speed to the mounted writable volume is slow, for example when the writable volume is mounted from a remote storage device or from a file share to which data transfer is slower than ideal, the performance of the virtual desktop and the user experience can be severely degraded due to delays in writing data to the writable volume.

In certain on-premises VDI deployments, the writeable volumes can reside locally with the virtual machines and provide rapid data transfer for the VM. In one such implementation of an on-premises VDI deployment that supports locally attached writeable volumes, user data can be delivered to a virtual machine by means of a writeable volume that is attached directly to the virtual machine. For example, the writeable volume can be locally mounted to the hypervisor in read/write mode. Because the writeable volume is local, in this case data transfer to the writeable volume may be rapid and existing technologies can provide sufficiently good desktop performance.

However, such local attachment of writeable volumes is not always possible or practicable. For example, many cloud-based deployments do not support locally attached writeable volumes and therefore must rely on writeable volumes that are not local. For example, the writeable volumes may need to be remote or stored on a network share. Write (and read) operations performed on writeable volumes that are remote or stored on network shares are much slower than on locally attached writeable volumes due to slower data transfer rates (e.g., network latencies, etc.) and this can significantly affect performance.

For example, a scenario where VMs utilizing attachable writeable volumes can exhibit significant performance limitations is within cloud-based VDI deployments where the virtual machines are hosted in a datacenter (e.g., a datacenter of a third-party service provider) and access writeable volumes that are remote or reside on a network share. An example of such a cloud-based service that can be used to deploy a virtual desktop infrastructure is Azure, available from Microsoft Corporation. In cloud-based deployments, such as Microsoft Azure, which do not support a local disk to be dynamically attached to a given virtual machine and where there is no control of the cloud-based hypervisor, the writeable volume may be stored on a network share and get mounted to the individual virtual machine from there. This adds an extra layer of file and disk input/output (I/O) over the network protocol, which can create a bottleneck for achieving good runtime performance.

The embodiments described herein provide systems and methods for high-performance delivery of attachable writeable volumes, particularly in cloud-based VDI environments that do not support locally attached writeable volumes, by implementing a differencing virtual disk to which data writes from the VM can be routed. The differencing virtual disk may be local to the VM (e.g., it may be located on the hypervisor) or be otherwise configured to provide fast data transfer capabilities. When a user logs onto the VM, the user's master writeable volume for maintaining the user's data is mounted to the VM. Physically, the master writeable volume may reside in a location to which data transfer is slower than the differencing virtual disk, such as on a remote storage device, a network share, etc.

When write commands are received at the VM, an agent operating on the VM can route the write commands to the differencing virtual disk to save the write data there. Since the differencing virtual disk is more rapidly accessible, the system won't incur the performance penalty of writing directly to the master writeable volume. Meanwhile, a background process running on the VM can sync the differencing virtual disk with the master writable volume to ensure that the master writeable volume is ultimately updated with the data written to the differencing virtual disk. An index can be used to track which data is available on the differencing disk and which data is available on the master disk. Subsequently, when a read command is received, the index can be used to determine whether the requested data is present on the differencing disk or on the master disk. An index can also be used to track the progress of syncing the differencing disk with the master disk. After the user logs off, the system can ensure that the disks are synced before shutting down the VM.

As a result, in cases where data transfer speeds from the virtual machine directly to the master writable volume would be slow, the performance penalty caused by write delays is spared by writing the data first to the local differencing virtual disk, and then syncing the master writable volume with the differencing virtual disk in the background to update the master writable volume.

As used throughout this disclosure, the terms "differencing virtual disk" and "differencing disk" are interchangeable. The terms "master virtual disk", "master disk", "master writeable volume", and "master volume" are interchangeable.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

Figure 1:
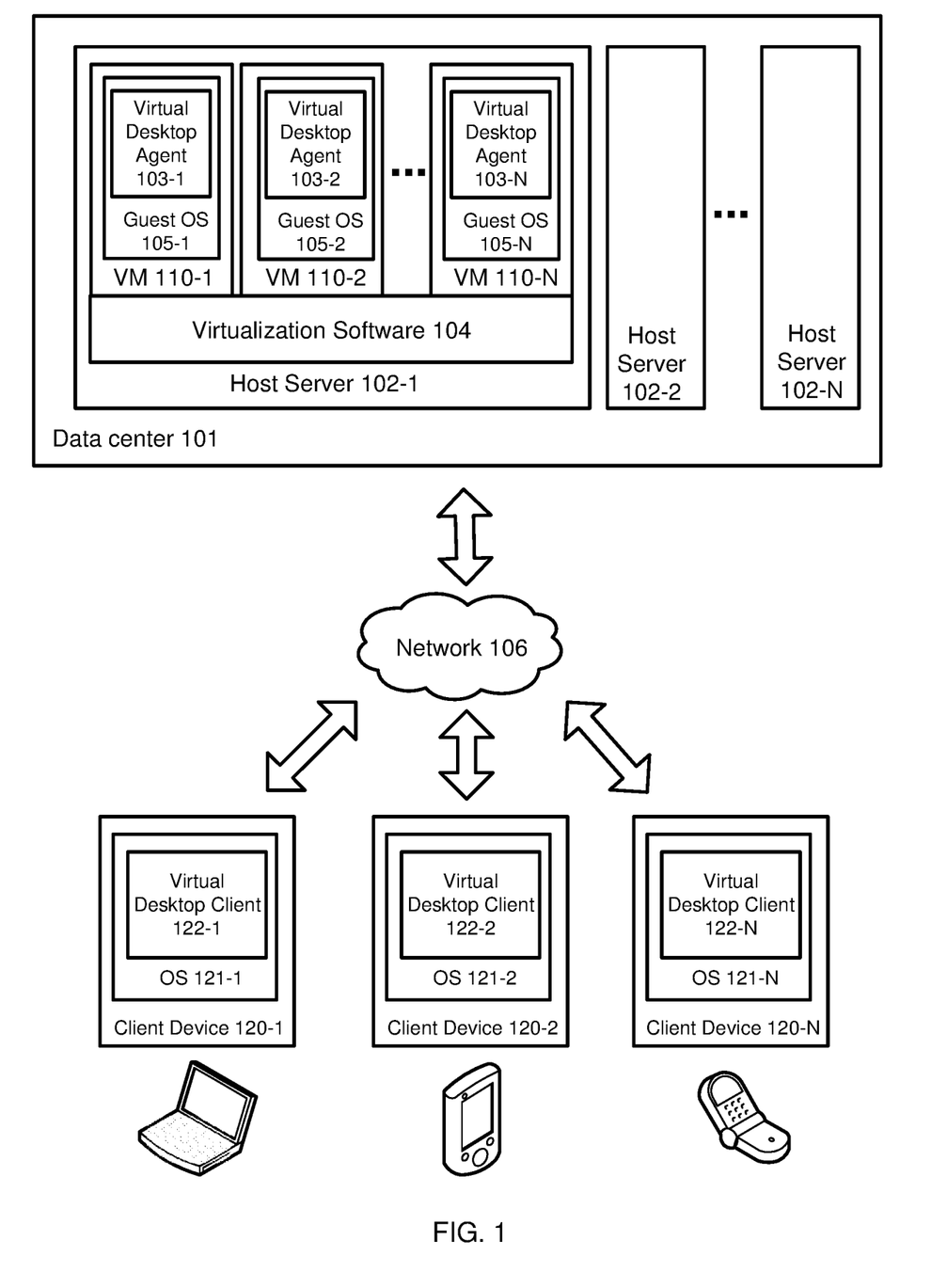
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
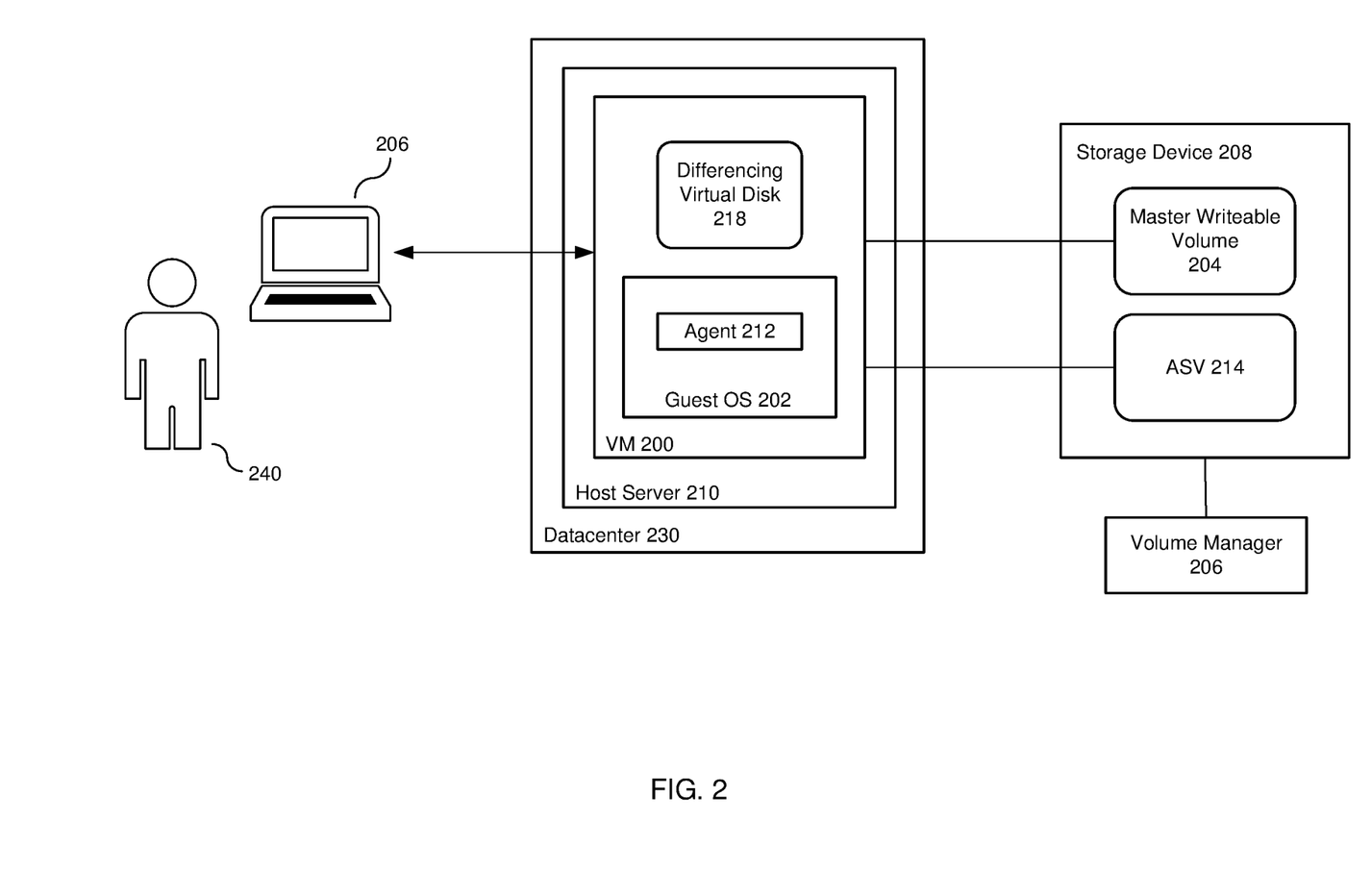
FIG. 2 illustrates an example architecture of a system for high performance implementation of attachable writeable volumes in virtual desktop environments, in accordance with various embodiments.

FIG. 2 illustrates an example architecture of a system for high performance implementation of attachable writeable volumes in virtual desktop environments, in accordance with various embodiments. As illustrated in the example of FIG. 2, a virtual machine (VM) 200 can run on a host server 210 in a datacenter 230 to provide a virtual desktop that is presented by a guest OS 202 to a user 240 of a remote client device 206 connected to the VM 200 over a network. The datacenter 230 may be an on-premises datacenter of an enterprise or a cloud-based datacenter, such as a datacenter used for third-party VDI products such as Microsoft Azure. While only one VM 200 is illustrated in this example, a real-world implementation would include multiple VMs hosted on the server 210, which may be accessed by different users on multiple client devices, as in the example of FIG. 1.

In various embodiments, the VM 200 may be a standard or "base" VM that is retrieved from a pool of available VMs in response to a request from a user. After the user 240 is authenticated for her virtual desktop, e.g., by validating login credentials, an agent 212 operating on the VM 200 can identify what writeable volumes and/or ASVs are assigned to the user 240 and mount those volumes on the VM 200 to provide the user with her personalized virtual desktop. For example, the system may maintain a master writable volume 204 that is assigned to the user and is mounted to the VM (e.g., 200) whenever the user logs in. The system may also maintain an ASV 214 that has been assigned to the user's desktop (e.g., by an administrator) in order to provide the user with various applications contained in the ASV 214. In this example, the agent 212 may identify that the ASV 214 and master writable volume 204 are assigned to the user 240 and mount the master writeable volume 204 and the ASV 214 to the VM 200 to provide the user 240 with her virtual desktop.

In various embodiments, an administrator can manage ASVs and writeable volumes (e.g., 214, 204) via a volume manager 206. For example, the administrator may be able to access the manager 206 via an interface and perform operations on user desktops such as assigning ASVs and writeable volumes to users' virtual desktops or unassigning previously assigned ASVs and writeable volumes from users' virtual desktops. In various embodiments, the manager 206 may reside on an enterprise server or be cloud-based (not pictured for the sake of being concise).

For example, to assign applications contained in an ASV to a user, an administrator can access the system (e.g., via an interface to the manager 206) and view a library of available ASVs (e.g., 214) containing various applications. The administrator can then assign an ASV (e.g., 214) to one or more user 240 desktops in order to deploy the applications in the ASV (e.g., 214) to the selected user's 240 desktop. Multiple ASVs can also be assigned to a single user desktop, in which case all of the assigned ASVs can be mounted to the VM during the virtual desktop session. When an ASV is assigned to a user's virtual desktop, each time the user logs into the virtual desktop, the assigned ASV can be mounted to the virtual machine to provide the contained applications in the virtual desktop. The system can likewise allow administrators to assign and un-assign writeable volumes (e.g., 204) to virtual desktops. Since user data in a virtual desktop is stored on the writeable volume, an administrator would generally assign a writeable volume (e.g., 204) to a virtual desktop when the desktop is first created or provisioned to a user, and that writeable volume would remain assigned to that user's virtual desktop permanently for storing the user's data.

In various embodiments, the ASV 214 may be a read-only virtual disk, such as a VHD or VMDK. The ASV 214 may contain all application components necessary for applications contained in the ASV 214 to be executed from the ASV 214. The ASV 214 may be initially created by an administrator through the ASV manager 206 by setting up a designated "capture" or "staging" machine, such as a clean VM, installing the applications on the capture machine, and capturing the application components into the ASV 214 during the installation. The same process can be repeated with numerous applications to capture each application on one ASV 214. The process of application capture can be automated. This may be performed using a file system filter driver, which can redirect file and registry open/create requests from one volume to another. During capture, a writable virtual disk is attached to (mounted on) the staging machine and all file/registry creation and modifications made during the application installation process are intercepted by the filter driver and redirected to the writable virtual disk, such that when the application is completely installed on the staging machine, all of the application content is captured on that disk.

In various embodiments, the master writeable volume 204 may be a read/write virtual disk, such as a VHD or VMDK, which is specifically assigned to the user 240. The master volume 204 can store user data such as user files, application settings (for applications in the ASV 214 and other applications), user profile, licensing information, configuration files, user-installed applications, and other. At first, i.e., when the writeable volume 204 is first provided to the user 240, it can be an empty VMDK or VHD file that is assign to the user 240. Subsequently, when the user 240 uses the virtual desktop, user 240 data can be saved to the master volume 204. Each time the user logs into the virtual desktop, the master volume 204 can be mounted to give the user 240 access to her data.

As illustrated, the master volume 204 and ASV 214 can reside on a storage device 208, which may for example be a physical hard disk, a storage array, or an SSD (Solid-State Drive). The storage device 208 may be located on a server (not pictured), which may be a different server than the host server 210, or on a network share. For example, the master volume 204 and ASV 214 may be on a network share that is on-premises, or on another server. The master volume 204 and ASV 214 in the storage 208 may be accessible to the VM 200 over a network, such as a LAN (local area network) or a WAN. The storage device 208 would also normally contain numerous other writeable volumes (assigned to other users), although only one writeable volume 204 is illustrated, and any of the writeable volumes could be mounted to a VM hosted on the host server 210. The storage device 208 would also normally contain numerous ASVs, although only one ASV 214 is illustrated, and any of the ASVs could be mounted and shared by any number of VMs hosted on the host server 210. For example, the ASV 214 can be mounted in read-only mode on multiple VMs, delivering to each VM the contained application(s).

The agent 212 executes in the guest OS 214 of the VM 200 and performs various functions related to the mounting and operation of ASVs (e.g., 214), writeable volumes (e.g., 204), and differencing virtual disks (e.g., 218). In various embodiments, once the user 240 logs into the virtual desktop, the agent 212 can automatically attach or mount the virtual disks of the master volume 204, differencing disk 218, and ASV 214 to the VM 200. The ASV 214 can be attached in read-only mode. The master volume 204 and differencing disk 218 can each be attached in read/write mode. A file-system filter driver in the agent 212 can merge the file and registry information from the master volume 204, differencing disk 218, and the ASV 214, as necessary, with the operating system 202 of the virtual machine 200 at runtime and generate a dynamic unified view for all the content and applications in the virtual disks in the virtual machine 200. This way, the applications in the ASV 214 can be executed in the VM 200 from the ASV 214, such that the applications can remain in the ASV 214 on the storage device 208 but the user 240 accessing the VM 200 will be able to launch and use the applications in the VM 200. Similarly, the content in the master volume 204 can remain in the master volume 204 on the storage device 208 but the user will be able to access the content in the VM 200.

The ASV 214, differencing disk 218, and master volume 204 may each appear in the VM 200 as a mounted drive. Alternatively, the ASV 214, differencing disk 218, and master volume 204 may be made to not appear as a separate mounted drive by hiding any assigned drive letter (or not mapping a separate drive letter at all) to the ASV 214, differencing disk 218, and master volume 204. Similarly, the applications in the ASV 214 can become available in the VM 200 and function and appear to the user 240 identical to how they would if installed directly in the VM 200.

In various embodiments, the agent 212 can configure the remote desktop as necessary so that the applications contained in the ASV 214 become available in the desktop and appear and perform as if natively installed, and so the user data available in the master volume 204 appears and is accessed as if natively present. For example, the agent 212 may modify the registry entries on the operating system 202 of the VM 200 to make the application executable directly from the virtual disk 204.

As illustrated in the example of FIG. 2, in this case the ASV 214 and master volume 204 have been assigned to the VM 200. The assignment of the ASV 214 and master volume 204 may be performed by pointing or directing the VM 200 to the location of the ASV 214 and master volume 204 on the storage device 208, without necessarily moving the ASV 214 and master volume 204 to a different physical location or making copies of the ASV 214 and master volume 204.

Hence, in various embodiments the agent 212 can be software applied to a virtual machine to virtualize any attached application storage volume, differencing disk, or writeable volume into the operating system to make the applications on the ASV and content in the writeable volume/differencing disk appear (to a user accessing the application on the VM 200 via a remote client device) as though the applications in the ASV 214 are natively installed and the content in the writeable volume 204/differencing disk 218 is natively present on the VM. Hence, when a mounted application is executed on a VM 200, the execution takes place from the ASV 214 in the storage device 208. The agent can operate as a filter driver and intercept calls to the mounted application from the OS 202 and direct them to the ASV virtual disk 214. Returns from the application on the ASV virtual disk 214 can likewise be routed back to the OS 202 by the agent 212.

In previous technologies, when data is read from or written to the master volume 204, those operations would also be routed by the agent 212 to the master volume 204 in the storage device 208. In that case, the agent could operate as a filter driver and intercept write/read requests from the OS 202 and direct them to the master volume 204 in the storage device 208. However, as discussed above, when the master volume 204 is located remotely or is otherwise not rapidly accessible, delays in completing the write commands can result in significantly diminished performance of the virtual desktop when using previous technologies.

In cases where the master volume 204 can be located locally (e.g., on the hypervisor of the VM 200) or where the system can be otherwise configured for fast write access to the master volume 204, this may not be an issue. However, in cases where the architecture does not allow for rapid write access directly to the master volume 204, performance can suffer when implementing previous technology. This can be the case when the storage device 208 is in a remote location or where for other reasons data transfer between the writeable volumes (e.g., master volume 204) and the virtual machines (e.g., VM 200) is slow, such as where the VMs (e.g., VM 200) are hosted on the cloud (e.g., with a product such as Microsoft Azure) and the master volumes (e.g., master volume 204) reside on the enterprise's network share or on a network share at the cloud VM service (e.g., network share at Azure itself). As used throughout this disclosure, a network share can be any computer storage resource capable of being accessed by the VMs over a network connection, such as a LAN (local area network), WAN (wide area network), or an enterprise intranet.

It should be noted that when the master volume 204 and ASV 214 cannot be accessed efficiently, such as when they are located remotely or on a network share, the ability to read data from the master volume 204 and ASV 214 is also affected, which impacts performance as well. However, delays in disk writes can be more problematic than reads from the performance perspective because the operating system 202 and applications may hang or freeze while waiting for a write to complete. Various optimizations can be implemented to improve the reading performance from the disk, such as data caching, pre-fetching, reading ahead, and so on, which cannot be implemented for disk writes.

In various embodiments, the differencing virtual disk 218, can be implemented to improve virtual desktop performance, particularly in situations where writing directly to the master volume 204 on the storage device 208 would be slow. The differencing disk 218 can be a virtual disk, such as a VHD or a VMDK file, to which data from the VM 200 can be written quickly and efficiently. In this example, the differencing virtual disk 218 can be located on a solid-state drive (SSD) on the hypervisor hosting the VM 200. Because the differencing disk 218 is local to the VM 200, writes and reads to it can be fast (i.e., much faster than writes and reads directly to the storage device 208 from the VM 200). In various VDI deployments, the hypervisor contains some limited local storage for various purposes, such as for keeping a pagefile used for caching data. The differencing disk 218 can be created and kept on such storage. Since the differencing disk 218 can hold data temporarily (at least until it is synced with the master volume 204), the size of the differencing disk 218 can be kept small and this type of limited memory can be sufficient. In other embodiments, the differencing disk 218 can be kept on other storage or memory, such as RAM on the hypervisor, a hard disk on the hypervisor, or other storage/memory device that may or may not be on the hypervisor, provided that the storage/memory device provides sufficiently fast write speeds to achieve acceptable desktop performance.

In various embodiments, the differencing virtual disk 218 can be created when the user 240 logs into the virtual desktop. For example, the differencing virtual disk 218 file can be created and kept on the SSD on the hypervisor that hosts the VM 200. Subsequently, the agent 212 (e.g., operating via a filesystem filter driver) can merge the mounted master writeable volume 204, the mounted ASV 214, the differencing virtual disk 218, and the VM 200 to create a single combined view to the operating system 202, applications, drivers, etc. in the VM 200, as mentioned above.

When a request to write data is received at the VM 200 (e.g., the request can be produced by the OS 202), the agent 212 can intercept (e.g., via a filesystem filter driver) the write request and convey it to the differencing disk 218. The data can then be written to the differencing disk 218. Since the differencing disk 218 is local, writes to the differencing disk 218 may be very fast and the successful write return can be received quickly, significantly faster than if the request was conveyed to the master volume 204 directly as with previous technologies. When the agent 212 writes the data to the differencing disk 218, it can also track (e.g., via an index or data structure such as a bitmap) that this location or portion of the master volume 204 has been modified and the agent 212 can record the location of the newly written data on the differencing disk 218. This way, if the data is requested in the future, the system (e.g., via the agent 212) can locate and retrieve the data from the differencing disk 218.

For example, a request may be received at the VM 200 to write data to a particular location of the master volume 204. The agent can intercept the write request and forward it to the differencing disk 218. The write data can be saved on the differencing disk 218 and the agent 212 can update a data structure or index to indicate that the data corresponding to that particular location of the master volume 204 has been modified, and that the modified data is located on the differencing disk 218 in its corresponding location there.

This way, writes on the VM 200 can be routed to the differencing disk 218 and the tracking mechanism (e.g., data structure) can be updated each time a write is saved on the differencing disk 218 to identify which parts of the master volume 204 were modified, and where on the differencing disk 218 the modified data is located.

In various embodiments, a background process (e.g., via one or more background threads) can run on the VM 200 (which can also be performed by the agent 212 and the filesystem filter driver) to sync the differencing disk 218 with the writeable volume 204. That is, the background process can save the data that is stored in the differencing disk 218 to its corresponding location on the master volume 204 (e.g., the background thread(s) can write the changed portions or blocks from the differencing disk 218 to the master volume 204). The agent 212 can also track the syncing process so that it can determine which portions of the differencing disk 218 have been synced with the master volume 204 (i.e., saved to their corresponding places in master volume 204). This tracking can allow the agent 212 to determine, at any given time, which parts of the differencing disk 212 have not yet been synced and which parts have been synced to avoid syncing the same parts twice, as well as to determine which parts of the differencing disk 218 can be safely deleted (e.g., to free up space on the differencing disk 218 if necessary, or at logoff). Once a portion of the differencing disk 218 is deleted, the agent can update its tracking mechanism (e.g., the data structure) to indicate that those portions are no longer available in the differencing disk 218, so that the system would refer to the master volume 204 next time there is a read request to those portions instead of the differencing disk 218.

In various embodiments, the tracking mechanism can include a data structure that identifies what portions (such as blocks) of the master volume 204 have been modified. The data structure or an index can also be used to identify where in the differencing disk 218 those portions or blocks are located. For example, when a particular block of the master volume 204 is modified by a write, the block can be written to the differencing disk 218 and a bit can be set in the data structure indicating that this block of the master volume 204 is modified. A block index or mapping can also indicate where (i.e., in what location or on what blocks) on the differencing disk 218 the modified data is located. This data structure and index can be part of the agent filter driver itself. The data structure can also identify which parts (e.g., blocks) of the differencing disk 218 have been synced with the master volume and which parts have not been synced. For example, the data structure can be a bitmap where one bit is used to identify that a block has been modified and one bit is used to indicate whether the modified block has been synced. In another embodiment, the tracking of the syncing can be done in a separate data structure.

Thus, when a read request for data (e.g., a request for non-cached data from the user 240 or from the virtual memory manager (VMM)) in the master volume 204 is received at the VM 200, the agent 212 can intercept the read request and determine whether the requested portions (e.g., blocks) of the master volume 204 are in the differencing disk 218 based on the tracking mechanism (data structure). If the agent 212 determines that the data is in the differencing disk 218 (e.g., these portions of the master volume 204 have been modified), then the read request can be routed to the corresponding location of the differencing disk 218 to retrieve the requested data. If the agent 212 determines that the data is not in the differencing disk 218 (e.g., these portions of the master volume 204 have not been modified), then the read request can be routed to the master volume 204 to retrieve the requested data.

In some cases, a read request may lie in part on data that is in the differencing disk 218 and in part on data that is in the master volume 204. For example, a single request for a contiguous set of blocks may be to some blocks in the differencing disk 218 and to some blocks in the master volume 204. In this case, the agent 212 can merge blocks retrieved from the differencing disk 218 with blocks retrieved from the master volume 204 so that all blocks are provided together (e.g., in a single buffer) in response to the read request. The entire process can be transparent so that, for example, an application requesting to read the data is unaware of the merging of blocks and retrieval of data from different volumes.

In various embodiments, it may be desirable to limit the size of the differencing disk 218 to a defined maximum (e.g., 200 megabytes). This can be the case when the differencing disk 218 is located on storage of a limited capacity, such as an SSD on the hypervisor. In this case, the system can track the size of the differencing disk 218 and once it exceeds a defined maximum size, the system (e.g., via the agent 212) can delete portions of the differencing disk 218 that have already been synced to reduce its size, so it is within the defined limit. The agent 212 can check with the data structure for tracking which portions (blocks) have been synced and only delete the portions (blocks) from the differencing disk 218 that have been synced.

In various embodiments, any time a portion or block is deleted from the differencing disk 218, the agent 212 can update the data structure to indicate that those portions are no longer available on the differencing disk 218, so that subsequent reads to those portions are routed to the master volume 204 instead.

In various embodiments, in order to ensure that data is not lost at logoff, when the user 240 requests to log out of the VM 200, the system first checks to ensure that the differencing disk 218 is fully synced with the master volume 204. For example, the agent 212 can check the sync-tracking data structure to confirm this. If the master volume 204 is not fully synced (e.g., this may happen when writes to the master volume 204 are very slow), then the system can hold off logoff and keep the VM 200 turned on until the sync is complete (i.e., until all portions or blocks from the differencing disk 218 have been written to the master volume 204). In an embodiment, if the system is not fully synced when logoff is requested, additional resources can be utilized to accelerate the syncing. For example, multiple threads (e.g., additional threads to the thread or threads used for background sync during normal operation of the VM) can be launched to accelerate the syncing if there are more blocks pending sync at logoff. Once the sync is complete, the system can log out the user 240 and shut down the VM 200.

During times when the master volume 204 is not fully synced with the differencing disk 218, if the system unexpectedly shuts down, such as due to a crash or a power outage, the master volume 204 can become corrupted as a result of only a portion of the writes being saved to the master volume 204. To address this vulnerability, a copy of the master volume 204 can be generated and stored so that if the master volume 204 becomes corrupted, the system can revert the desktop to the stored copy of the master volume 204 next time the user 240 logs in. This copy can be generated by the system while the user 240 is logged off so that the user 240 doesn't need to wait for the copy to be generated during use of the desktop. For example, the copy can be generated after the user 240 logs out of a session so that it is already available next time the user 240 logs in.

Figure 3:
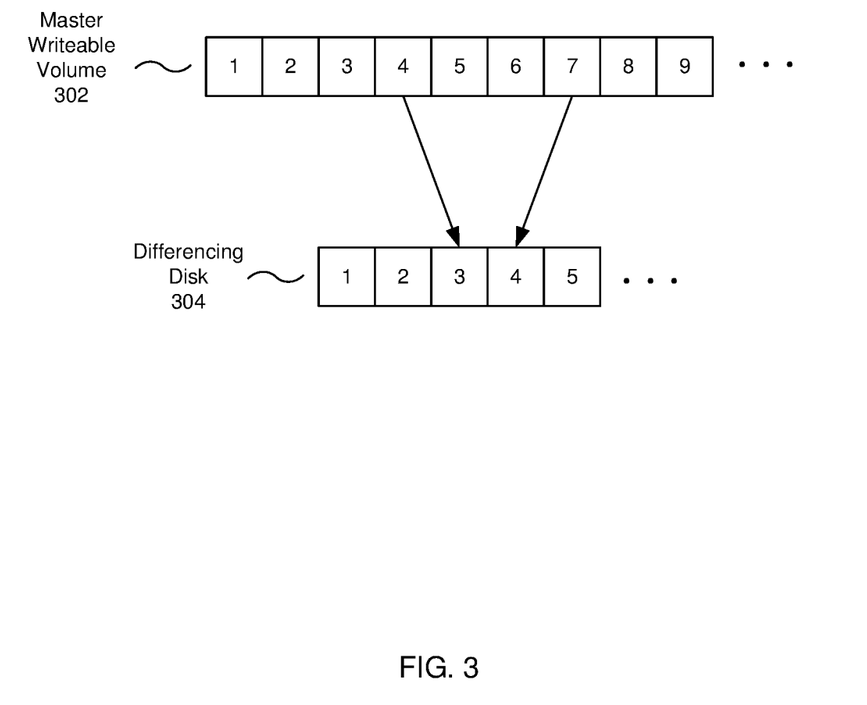
FIG. 3 illustrates an example of a differencing disk and a master writeable volume operating at the block level, in accordance with various embodiments.

FIG. 3 illustrates an example of a differencing disk and a master writeable volume operating at the block level, in accordance with various embodiments. As illustrated in the example of FIG. 3, a master writeable volume 302 includes data blocks 1 through 9, as well as further blocks that are not illustrated. A differencing disk 304 contains data blocks 1 through 5, as well as further blocks that are not illustrated. In this example, a write request is received at the VM to modify blocks 4 and 7 of the master volume 302. The write request is routed to the differencing disk and modified block 4 of the master volume 302 is written to block 3 of the differencing disk 304, while modified block 7 of the master volume 302 is written to block 4 of the differencing disk 304, as illustrated by the arrows.

Consequently, the tracking data structure can be updated to indicate that blocks 4 and 7 of the master volume 302 have been modified. The data structure or a separate block index can also be updated to indicate that the data for modified blocks 4 and 7 of the master volume 302 is located in blocks 3 and 4, respectively, of the differencing disk 304, so that any read requests for blocks 4 and 7 of the master volume 302 can be routed to blocks 3 and 4, respectively, of the differencing disk 304. For example, such data structure or index can indicate, for each block of the master volume 302 that has modified, which block of the differencing disk 304 contains the modified block (i.e., contains the data for the modified block).

After the modified blocks are written to the differencing disk 304, the same or a different data structure can also be marked to indicate that blocks 3 and 4 of the differencing disk are not synced with respective blocks 4 and 7 of the master volume 302, since the master volume 302 contains different data in blocks 4 and 7 than what the differencing disk 304 contains in blocks 3 and 4, respectively. Consequently, the background process can sync these blocks by writing block 3 of the differencing disk 304 to block 4 of the master volume 302, and block 4 of the differencing disk 304 to block 7 of the master volume 302. As each block is synced, the data structure can be updated to indicate that the block is now synced between the master volume 302 and the differencing disk 304. During operation, the background process can scan this data structure to determine which blocks have not been synced and which blocks to sync next.

When a read request is received, the agent can check the data structure to determine where the requested data is located. If the read request is to blocks 4 or 7 of the master volume 302, the agent can determine based on the data structure that the corresponding blocks have been modified and that the modified data is contained in blocks 3 and 4, respectively, of the differencing block 304 (the location of the blocks in the differencing disk 304 may be determined based on a block index). The agent can then retrieve the respective blocks 3 and 4 from the differencing disk 304 and provide them in response to the read request.

If the read request is to blocks other than 4 or 7 of the master volume 302 (e.g., to blocks 1 and 2), the agent can determine based on the data structure that the corresponding blocks have not been modified and, consequently, the requested blocks 1 and 2 can be retrieved directly from the master volume 302 and provided in response to the request.

If a contiguous read request lies on blocks that are in both disks 302, 304 such as a request to read blocks 3 through 7 of the master volume 302, the agent can determine based on the data structure which of the requested blocks have been modified (blocks 4 and 7), and which of the requested blocks have not been modified (blocks 3, 5, and 6). The agent can locate the modified blocks in the differencing disk 304 (e.g., based on a block index), which are blocks 3 and 4 of the differencing disk 304. The agent can retrieve the unmodified blocks (3, 5, 7) from the master volume 302 and the modified blocks from the differencing disk 304, which would be blocks 3 and 4 of the differencing disk 304. The agent can then merge or stitch the blocks together and provide the data in response to the read request.

Figure 4:
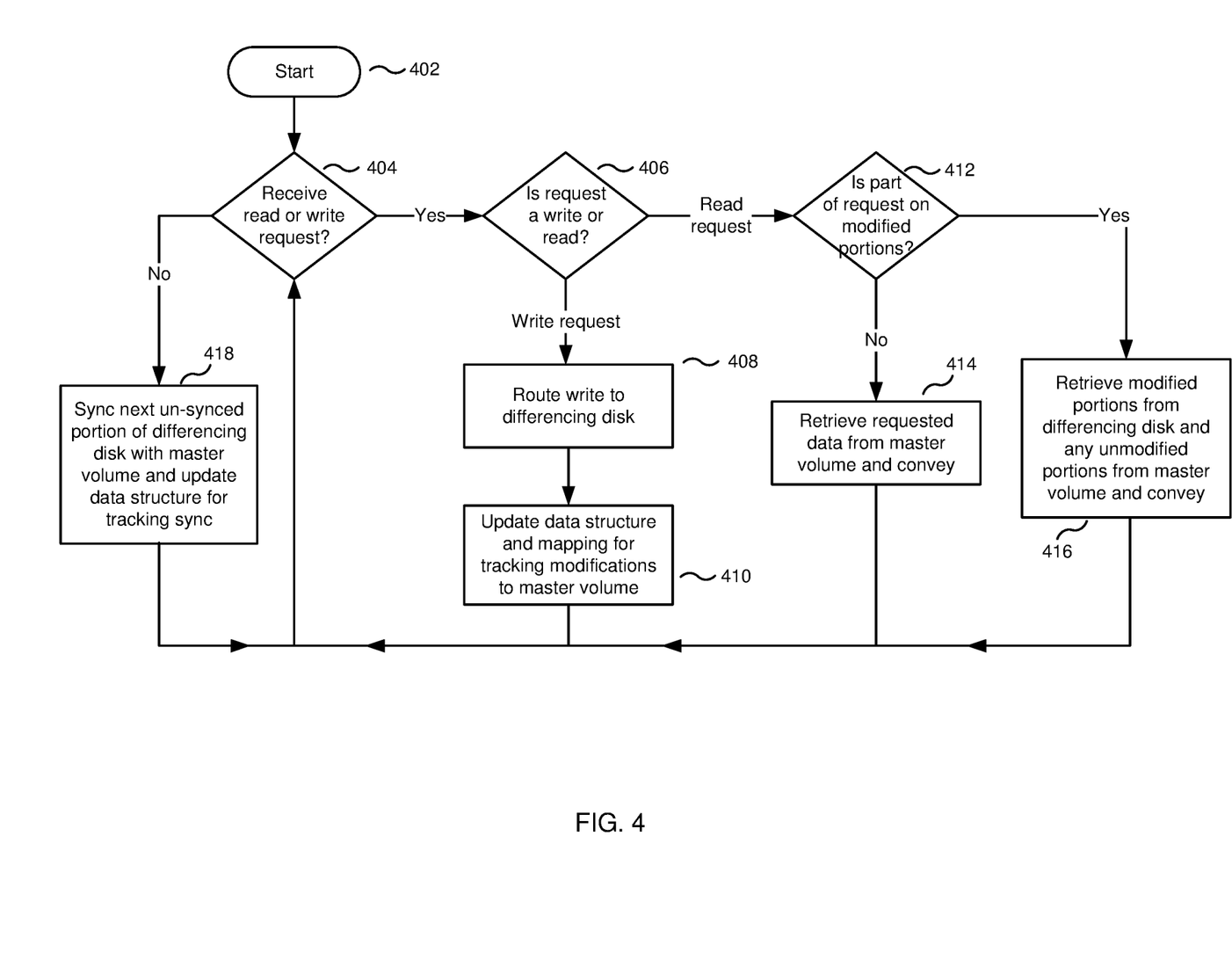
FIG. 4 illustrates an example process flow for high performance implementation of attachable writeable volumes in virtual desktop environments, in accordance with various embodiments.

FIG. 4 illustrates an example process flow for high performance implementation of attachable writeable volumes in virtual desktop environments, in accordance with various embodiments. The process can begin in operation 402. In operation 404, the process can determine whether a request to read or write data from or to the master volume has been received at the VM. For example, the read/write request may be produced in the VM's operating system. If the process determines that a read or write request has been received, then it can proceed to operation 406, where it determines whether the request is a write or a read.

If the request is a request to write data to the master volume, then the process can proceed to operation 408, where the request can be routed to the differencing disk (e.g., after being intercepted by the agent) to save the data there. After the data is written to the differencing disk, in operation 410, the data structure for tracking modifications to the master volume can be updated to indicate that the corresponding portion of the master volume has been modified. The data structure or an index can also be updated to map the location of the master volume modified by the write, to the location on the differencing disk where the data was actually written, so that future requests for data in this location can be routed to the appropriate location of the differencing disk based on the mapping. The process can then return to operation 404, where it determines if another read or write request has been received.

If, in operation 406 the process determines that the request is a read request, then the process can proceed to operation 412, where the process can determine whether any part of the read request lies on portions of the master volume that have been modified. If the process determines that no part of the of the read request lies on portions of the master volume that have been modified (i.e., the entire request is to unmodified portions of the master volume), then the process can proceed to operation 414, where the requested data can be retrieved from the master volume and conveyed in response to the read request. The process can then return to operation 404, where it determines if another read or write request has been received.

If, in operation 412, the process determines that at least part of the read request lies on portions of the master volume that have been modified (i.e., the entire request can be to modified portions of the master volume or only a portion of the read request can be to modified portions of the master volume), then the process can proceed to operation 416. In operation 416, data requested from portions of the master volume that have been modified can be retrieved from the differencing disk and data requested from portions of the master volume that have not been modified (if any) can be retrieved from the master volume. For example, in this step the system can determine what parts of the read request lie on portions of the master volume have been modified based on the data structure for tracking modifications produced in operation 410, and those portions can be located in and retrieved from the differencing disk based on the mapping. The data retrieved from the differencing disk and the data retrieved from the master volume (if any) can then be combined and conveyed in response to the read request. The process can then return to operation 404, where it determines if another read or write request has been received.

If, in operation 404, the process determines that a read or write request has not been received, then it can proceed to operation 418, where (e.g., via a background process) a next un-synced portion of the differencing disk is synced with the master volume and a data structure for tracking the syncing of the differencing disk is updated to indicate that the corresponding portion has been synced. The process can then return to operation 404, where it determines if another read or write request has been received.

Figure 5:
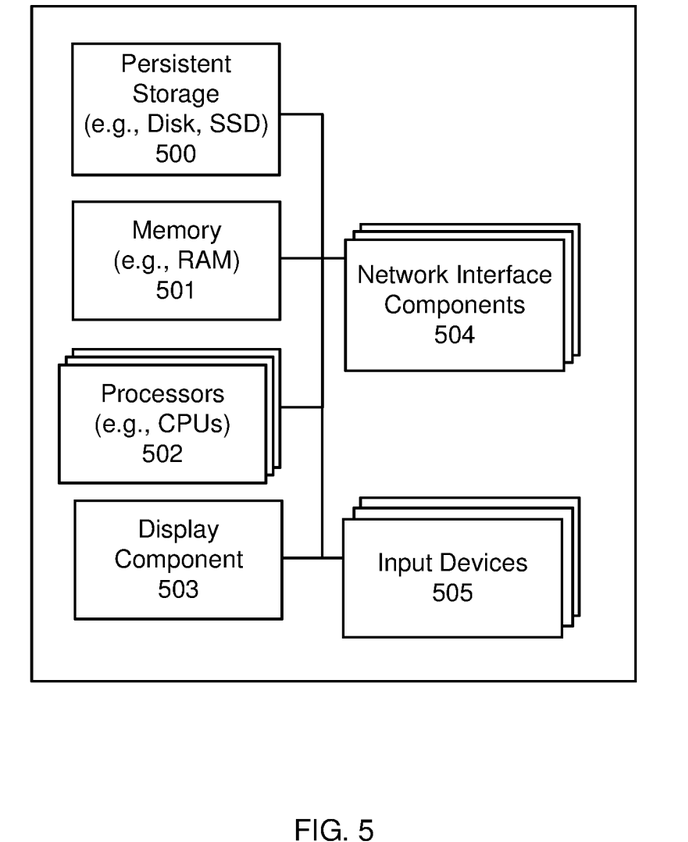
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for capturing write data of a virtual machine (VM) hosted on a server on a master writable virtual disk, comprising:
by an agent executing on the VM,
mounting the master writeable virtual disk residing on a first storage device to the VM, the master writeable virtual disk storing user data of the VM;
mounting a differencing virtual disk to the VM and routing write commands on the VM to the differencing virtual disk, the differencing virtual disk residing on a second storage device;
receiving a request at the VM to write data to a location of the master writable virtual disk;
saving the data to the differencing virtual disk;
by a background process running during operation of the VM, syncing the differencing virtual disk mounted to the VM with the master writable virtual disk mounted to the VM by writing the data saved to the differencing virtual disk to the location of the master writable virtual disk.

2. The method of claim 1, further comprising:
receiving a request to read content from the master writeable virtual disk at the VM;
in response to the read request:
determining that a first portion of requested content is present in the differencing virtual disk and that a second portion of requested content is present in the master virtual disk; and
retrieving the first portion of the requested content from the differencing virtual disk and the second portion of the requested content from the master writable virtual disk.

3. The method of claim 1, further comprising:
after saving the data to the differencing virtual disk, marking a first data structure for tracking write data stored on the differencing virtual disk to indicate that the data corresponding to the location of the master writable virtual disk is available on the differencing virtual disk;
receiving a request to read data in the location of the master writable virtual disk;
determining based on the first data structure that the data corresponding to the location of the master writable virtual disk is available in the differencing virtual disk; and
reading the data from the differencing virtual disk.

4. The method of claim 1, further comprising:
after writing the data saved to the local differencing virtual disk to the location of the master writable virtual disk, marking a second data structure to indicate that the data has been synced with the master writable virtual disk.

5. The method of claim 4, wherein the background process for syncing the local differencing virtual disk with the master writable virtual disk refers to the second data structure to determine what portions of the differencing virtual disk have not been synced.

6. The method of claim 1, wherein the local differencing virtual disk is located on at least one of a storage local to a hypervisor of the VM or a random-access memory local to the hypervisor of the VM.

7. The method of claim 1, wherein logoff of the VM is delayed until the differencing virtual disk and the master writable virtual disk are fully synced.

8. A computing device for capturing write data of a virtual machine (VM) hosted on a server on a master writable virtual disk, comprising:
at least one processor; and
memory including instructions that, when executed by the at least one processor, cause the computing device to perform the steps of:
by an agent executing on the VM,
mounting the master writeable virtual disk residing on a first storage device to the VM, the master writeable virtual disk storing user data of the VM;
mounting a differencing virtual disk to the VM and routing write commands on the VM to the differencing virtual disk, the differencing virtual disk residing on a second storage device;
receiving a request at the VM to write data to a location of the master writable virtual disk;
saving the data to the differencing virtual disk;
by a background process running during operation of the VM, syncing the differencing virtual disk mounted to the VM with the master writable virtual disk mounted to the VM by writing the data saved to the differencing virtual disk to the location of the master writable virtual disk.

9. The computing device of claim 8, wherein the memory further includes instructions that when executed by the at least one processor, cause the computing device to perform the steps of:
receiving a request to read content from the master writeable virtual disk at the VM;
in response to the read request:
determining that a first portion of requested content is present in the differencing virtual disk and that a second portion of requested content is present in the master virtual disk; and
retrieving the first portion of the requested content from the differencing virtual disk and the second portion of the requested content from the master writable virtual disk.

10. The computing device of claim 8, wherein the memory further includes instructions that when executed by the at least one processor, cause the computing device to perform the steps of:
after saving the data to the differencing virtual disk, marking a first data structure for tracking write data stored on the differencing virtual disk to indicate that the data corresponding to the location of the master writable virtual disk is available on the differencing virtual disk;
receiving a request to read data in the location of the master writable virtual disk;
determining based on the first data structure that the data corresponding to the location of the master writable virtual disk is available in the differencing virtual disk; and
reading the data from the differencing virtual disk.

11. The computing device of claim 8, wherein the memory further includes instructions that when executed by the at least one processor, cause the computing device to perform the steps of:
after writing the data saved to the local differencing virtual disk to the location of the master writable virtual disk, marking a second data structure to indicate that the data has been synced with the master writable virtual disk.

12. The computing device of claim 11, wherein the background process for syncing the local differencing virtual disk with the master writable virtual disk refers to the second data structure to determine what portions of the differencing virtual disk have not been synced.

13. The computing device of claim 8, wherein the local differencing virtual disk is located on at least one of a storage local to a hypervisor of the VM or a random-access memory local to the hypervisor of the VM.

14. The computing device of claim 8, wherein the master writable virtual disk is located on a network share and is accessed remotely by the VM.

15. A non-transitory computer readable storage medium for capturing write data of a virtual machine (VM) hosted on a server on a master writable virtual disk, comprising one or more sequences of instructions, the instructions when executed by one or more processors causing the one or more processors to execute the operations of:
  by an agent executing on the VM,
    mounting the master writeable virtual disk residing on a first storage device to the VM, the master writeable virtual disk storing user data of the VM;
    mounting a differencing virtual disk to the VM and routing write commands on the VM to the differencing virtual disk, the differencing virtual disk residing on a second storage device;
  receiving a request at the VM to write data to a location of the master writable virtual disk;
  saving the data to the differencing virtual disk;
  by a background process running during operation of the VM, syncing the differencing virtual disk mounted to the VM with the master writable virtual disk mounted to the VM by writing the data saved to the differencing virtual disk to the location of the master writable virtual disk.

16. The non-transitory computer readable storage medium of claim 15, further comprising instructions that when executed by the one or more processors cause the one or more processors to execute the operations of:
  receiving a request to read content from the master writeable virtual disk at the VM;
  in response to the read request:
    determining that a first portion of requested content is present in the differencing virtual disk and that a second portion of requested content is present in the master virtual disk; and
    retrieving the first portion of the requested content from the differencing virtual disk and the second portion of the requested content from the master writable virtual disk.

17. The non-transitory computer readable storage medium of claim 15, further comprising instructions that when executed by the one or more processors cause the one or more processors to execute the operations of:
  after saving the data to the differencing virtual disk, marking a first data structure for tracking write data stored on the differencing virtual disk to indicate that the data corresponding to the location of the master writable virtual disk is available on the differencing virtual disk;
  receiving a request to read data in the location of the master writable virtual disk;
  determining based on the first data structure that the data corresponding to the location of the master writable virtual disk is available in the differencing virtual disk; and
  reading the data from the differencing virtual disk.

18. The non-transitory computer readable storage medium of claim 15, further comprising instructions that when executed by the one or more processors cause the one or more processors to execute the operations of:
  after writing the data saved to the local differencing virtual disk to the location of the master writable virtual disk, marking a second data structure to indicate that the location data has been synced with the master writable virtual disk.

19. The non-transitory computer readable storage medium of claim 18, wherein the background process for syncing the local differencing virtual disk with the master writable virtual disk refers to the second data structure to determine what portions of the differencing virtual disk have not been synced.

20. The non-transitory computer readable storage medium of claim 15, wherein logoff of the VM is delayed until the differencing virtual disk and the master writable virtual disk are fully synced.

* * * * *